United States Patent [19]
Taragan et al.

[11] Patent Number: 6,090,422
[45] Date of Patent: Jul. 18, 2000

[54] REFRIGERATOR WITH AUTOMATIC VACUUM COMPARTMENT AND METHOD OF PRESERVING FRESH FOOD ITEMS USING THE SAME

[76] Inventors: Arie Taragan; Henry Chaim Oami, both of 2175 Old Concord Rd., Smyrna, Ga. 30080

[21] Appl. No.: 09/372,012

[22] Filed: Aug. 11, 1999

[51] Int. Cl.[7] .............................. A23L 3/00; F25B 19/00
[52] U.S. Cl. .............................. 426/231; 62/100; 62/169; 62/268; 426/524
[58] Field of Search ..................... 426/231, 524; 62/100, 169, 170, 268, 270; 99/472

[56] References Cited

U.S. PATENT DOCUMENTS

| | | | |
|---|---|---|---|
| 3,216,214 | 11/1965 | Gasbarro | 62/170 |
| 4,584,841 | 4/1986 | Guillaume et al. | 62/62 |
| 4,615,178 | 10/1986 | Badenhop | 62/100 |
| 4,821,530 | 4/1989 | Ledbetter | 62/332 |
| 5,131,237 | 7/1992 | Valbjorn | 62/175 |
| 5,375,431 | 12/1994 | Later et al. | 62/268 |
| 5,505,056 | 4/1996 | Jones | 62/78 |

*Primary Examiner*—George C. Yeung
*Attorney, Agent, or Firm*—Thomas, Kayden, Horstemeyer & Risley

[57] ABSTRACT

A refrigerator (10) includes a vacuum cabinet (20) which includes a vacuum compartment (42) and an open top drawer (34) in the vacuum compartment. When the refrigerator door is closed, a rotary spool (75) of the air control valve (70) is moved to a position to recirculate air from the vacuum compartment through the vacuum pump (65) back into the vacuum compartment so as to pre-chill the contents of the vacuum compartment. Later, while the refrigerator door is still closed, the air control valve is shifted so that the vacuum pump (65) draws air from the vacuum compartment until a predetermined low air pressure is detected in the vacuum compartment, whereupon the operation of the vacuum pump terminates. When the refrigerator door is opened, the valve spool (75) rotates to vent the vacuum compartment to the atmosphere, thereby equalizing the pressure within the vacuum compartment to atmospheric pressure and allowing the open top drawer of the vacuum compartment to be opened.

16 Claims, 3 Drawing Sheets

REFRIGERATOR WITH AUTOMATIC VACUUM COMPARTMENT AND METHOD OF PRESERVING FRESH FOOD ITEMS USING THE SAME

FIELD OF THE INVENTION

This invention relates to the preservation of foods in refrigerated spaces, in the presence of a vacuum.

BACKGROUND OF THE INVENTION

It is well known that fresh foods can be preserved for prolonged times when refrigerated. Refrigerators and freezers have been developed and placed in the typical household so as to be readily accessible to the occupants of the household. The refrigerators typically include a large door that can be opened to expose the interior of the refrigerator, with a light switch that illuminates an interior light to illuminate the interior of the refrigerated space. Typically, perishable food items are placed on shelves within the interior storage space of the refrigerator.

There are occasions when the refrigerator door is closed and remains closed for long periods, such as overnight, or even several days at a time. At other times, the refrigerator door might be opened and closed several times in a short period, such as during and after the preparation of a meal, where the person must have access to all the food items in the refrigerator and retrieve food items from and deposit food items in the refrigerated storage space. During the busy meal times, the refrigerated storage space usually is somewhat unstable in that warm air is allowed to enter the refrigerated storage space when the door is open. When groceries are first being placed in the refrigerated space, items at atmospheric temperature tend to raise the temperature of the storage space. Usually, this requires the refrigeration system to operate to recover the desired low temperature of the refrigerated storage space. Once the desired interior temperature has been recovered in the refrigerated storage space and the refrigerator door remains closed, the operation of the compressor and other elements of the refrigeration system can be terminated and remain terminated for long periods.

While refrigerated storage spaces have been the most popular means for preserving fresh foods, it is also possible to preserve foods in compartments having reduced interior pressure, generally known as vacuum compartments. For example, a compartment can be opened, a fresh food item placed in the compartment, the compartment closed and sealed against the atmosphere, and some of the atmosphere within the compartment withdrawn from the compartment, thereby reducing the interior pressure about the fresh foods. The reduced interior pressure within the vacuum compartment tends to radically reduce the rate of deterioration of the fresh food within the compartment.

Although the use of a vacuum compartment to preserve fresh foods is known in the art, the use of vacuum compartments in the typical household has not become practical. Some of the problems of using vacuum compartments are that the air pressure in the vacuum compartment must be equalized with respect to atmospheric pressure before the compartment can be opened. This requires a waiting period for the person trying to retrieve food from or deposit food in the vacuum compartment. Also, since the typical household already has a refrigerator, the use of a vacuum compartment for preservation of foods is considered to be somewhat redundant.

Accordingly, it appears that there has been no development of a practical combination of a refrigerated storage space that includes a vacuum cabinet positioned in the storage space, whereby fresh food items can be storage in the vacuum cabinet and preserved in an atmosphere of reduced temperature and reduced pressure.

It is to this end that the invention disclosed herein is applied.

SUMMARY OF THE INVENTION

Briefly described, the present invention comprises a refrigerator having a vacuum compartment for food preservation, and a method of preserving fresh food items in a refrigerator.

The refrigerator is similar to the conventional household refrigerator, in that it includes a refrigerator housing defining a storage space for storing food items, with the usual front access opening and the refrigerator door which is adapted to selectively close and open the access opening. A conventional refrigerant system is utilized for cooling the storage space and making ice. A door switch responsive to the opening and closing of the refrigerator door illuminates a lamp in the refrigerator housing so as to illuminate the food items in the housing.

Combined with the refrigerator housing is a vacuum cabinet which typically would be placed in the lower portion of the refrigerator housing. The vacuum cabinet defines a vacuum compartment and a door selectively opens and closes an opening of the vacuum cabinet that faces the refrigerator door. A seal is formed between the vacuum compartment door and the vacuum cabinet so as to seal the vacuum compartment from the atmosphere. In the embodiment disclosed herein, the vacuum compartment door is part of a drawer having an open top container slidable into and out of the vacuum compartment of the vacuum cabinet and a closure panel mounted to an end of the open top container. The closure panel is sized, shaped and adapted to engage against the opening of the vacuum compartment, with a seal strip disposed between the facing surfaces of the closure panel and the vacuum cabinet for sealing the vacuum compartment from the atmosphere. Other shapes and arrangements of vacuum cabinets can be utilized, such as a simple vacuum compartment with a door hingedly mounted to the vacuum cabinet for selectively opening and closing the vacuum compartment.

An air exhaust system is mounted in communication with the vacuum compartment, which includes a vacuum pump having an inlet conduit in communication with the vacuum compartment, where the vacuum pump can draw air out of the vacuum compartment. Also, another conduit communicates from the outside of the refrigerator housing with the vacuum compartment which selectively vents the vacuum compartment to the atmosphere. A control valve is arranged so as to selectively close the vent conduit while the exhaust conduit remains open, to close the exhaust conduit while the vent conduit remains open, and to recirculate air from the vacuum compartment, through the vacuum pump, through the valve, and back to the vacuum compartment. This recirculation arrangement allows rapid cooling of the fresh foods within the vacuum compartment.

In a typical cycle of operation, the vacuum compartment will have been opened, fresh food items placed therein, and the vacuum compartment closed and the refrigerator door closed. A timer responsive to the door switch of the refrigerator door begins its cycle of operation, and no further action is taken with regard to the evacuation system for a predetermined time, usually ten minutes.

When the refrigerator door remains closed and the timer times out, the air control valve is shifted by a solenoid to its recirculation position and the motor of the vacuum pump is energized. This causes the air in the vacuum compartment to be recirculated from the vacuum compartment, to the check valve, to the vacuum pump, through the air control valve, and then back to the vacuum compartment. This recirculation of the previously cool air in the vacuum compartment causes the air to more readily contact the interior surfaces of the vacuum compartment and its internal components, such as the open top drawer so that the reduced temperature surfaces of the vacuum compartment tend to cool the air, and the air, in turn, pre-cools the fresh food items in the vacuum compartment.

After a predetermined period, the timer shifts the air control valve to a second position which closes the recirculation conduit and actuates the motor of the vacuum pump, causing the air within the vacuum compartment to be withdrawn from the vacuum compartment.

An air pressure detector monitors the air pressure within the vacuum compartment, and when the air pressure within the vacuum compartment has been reduced to a predetermined amount, the circuit made to the vacuum pump motor is opened, so that no more air is withdrawn from the vacuum compartment, leaving the vacuum compartment with a reduced internal air pressure. A check valve between the vacuum pump and the vacuum compartment prevents inadvertent leakage of air back into the vacuum compartment.

Should the air pressure in the vacuum compartment inadvertently rise due to leakage, the air pressure detector will reenergize the vacuum pump motor to repeat the prior cycle.

When the refrigerator door is opened, the door switch which controls the illumination of the interior lamp of the refrigerator housing, or a parallel door switch, operates a solenoid which rotates the air control valve to its vent position, thereby allowing air to enter from the atmosphere back into the vacuum compartment, resulting in equalizing the pressure of the vacuum compartment to the atmosphere. This allows the door of the vacuum compartment to be opened without resistance from reduced air pressure.

Therefore, the refrigerator chills the vacuum cabinet which in turn chills the food items in the vacuum compartment, and the vacuum system withdraws air from the vacuum compartment, thereby reducing the internal pressure within the vacuum compartment. The results of the reduced temperature and reduced pressure vacuum compartment are that the food items tend to deteriorate more slowly than when compared to the typical household refrigerator.

Thus, it is an object of this invention to provide an improved food preservation system for preserving food in reduced temperature and reduced pressure conditions.

Another object of this invention is to provide a refrigerator that includes a vacuum cabinet located in the refrigerated storage space and a vacuum inducement system for drawing a reduced air pressure in the vacuum compartment.

Other objects, features and advantages of the present invention will become apparent upon reading the following specification, when taken in conjunction with the accompanying drawings.

DETAILED DESCRIPTION

Figure 1:
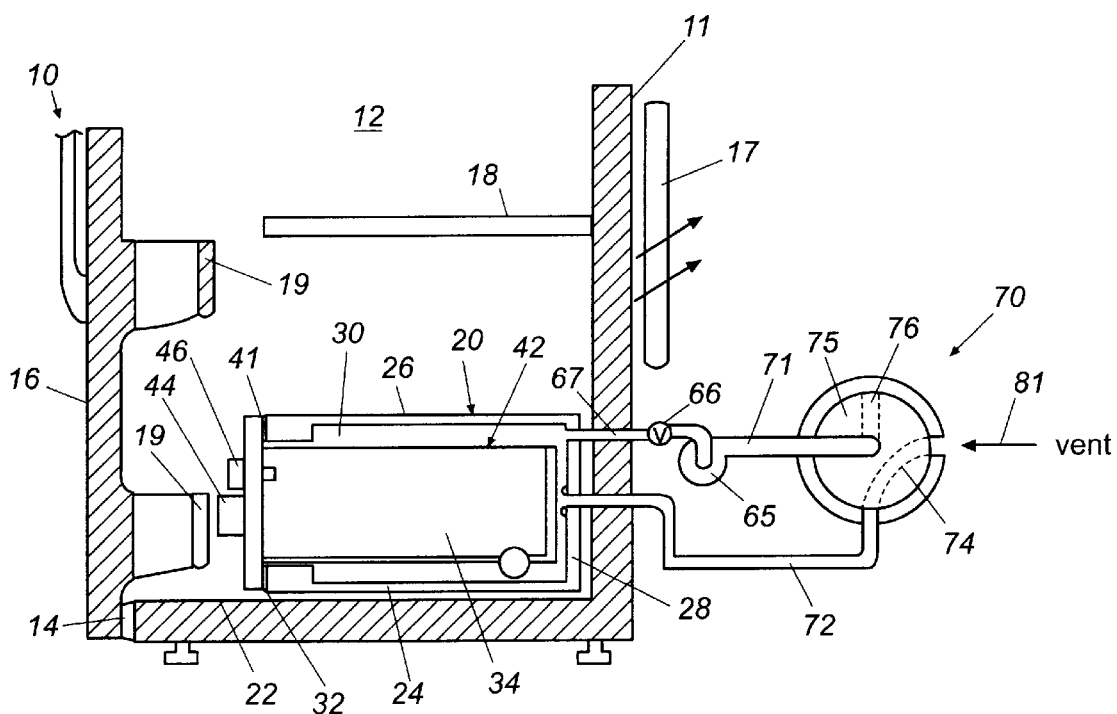
FIG. 1 is a side cross-sectional view of a refrigerator having a vacuum cabinet positioned therein, with the vacuum control system being schematically illustrated.

Referring now in more detail to the drawings, in which like numerals indicate like parts throughout the several views, FIG. 1 shows a refrigerator 10 which includes a housing 11 defining an interior refrigerator storage space 12. A front opening 14 is formed in the housing 11, and the refrigerator door 16 is hingedly mounted to the housing in the usual manner so as to function to selectively open and close the storage space 12, whereby access to the storage space is available. A conventional refrigeration system, generally not shown, has its heat exchange coils 17 mounted to the housing functions to refrigerate the interior storage space 12 in the conventional manner. Conventional horizontal shelves 18 are mounted in the housing 11, and door shelves 19 are supported by the door 16, all in the conventional manner.

A vacuum cabinet 20 is placed in the storage space 12 of the refrigerator 10. In the embodiment illustrated, the vacuum cabinet 20 is placed on the bottom wall or floor 22 of the housing 11, but it will be understood that the vacuum cabinet can be placed in other positions about the storage space 12, if desired.

The vacuum cabinet 20 is shown as having bottom and top walls 24 and 26, rear wall 28, and opposed side walls 30 (only one shown). The vacuum cabinet has a front opening 32 formed by the edges of the bottom, top and opposed side walls.

Figure 5:
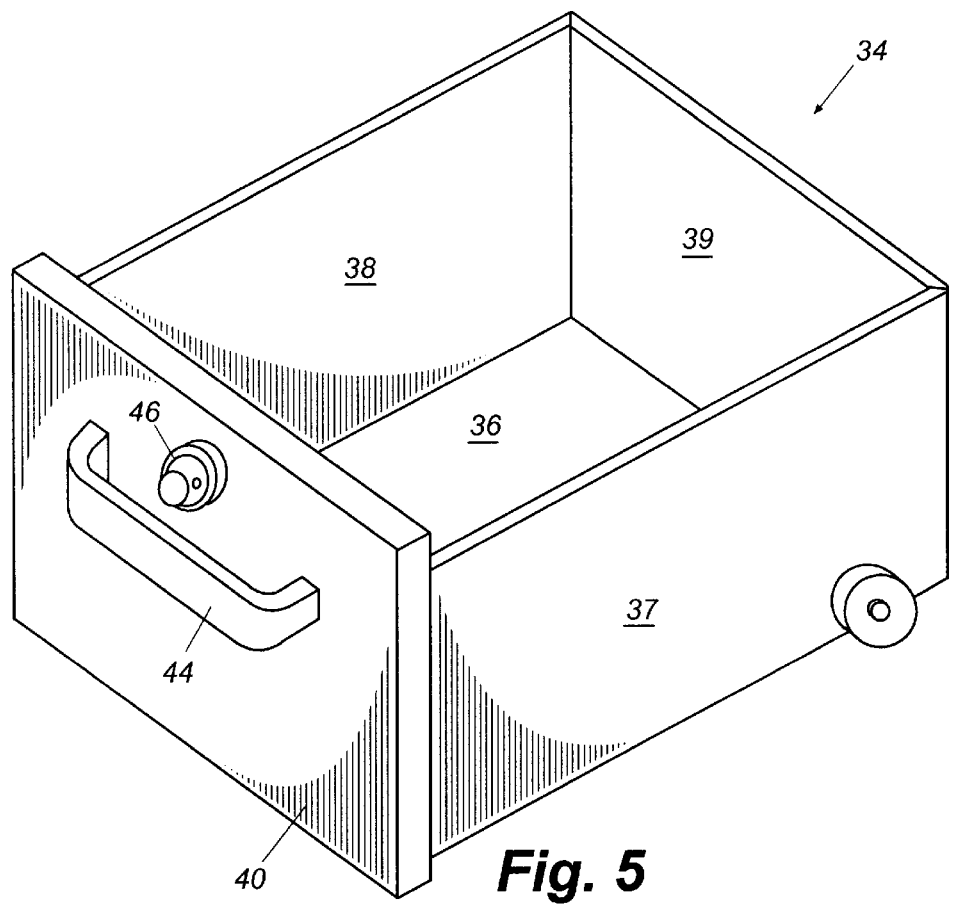
FIG. 5 is a perspective illustration of the open top drawer of the vacuum cabinet of FIG. 1.

An open top drawer 34 is placed in the vacuum cabinet. As illustrated in FIG. 5, the open top drawer includes bottom wall 36, opposed side walls 37 and 38, rear wall 39, and a closure panel 40 that functions as a door of the vacuum cabinet 20. The vacuum cabinet 20 and the door 40 form a vacuum compartment 42 in which the open top drawer 34 normally resides. A seal strip 41 is formed about all four edges of the door 40 for engaging and sealing against the vacuum cabinet.

An access handle 44 is mounted to the closure panel 40 of the open top drawer so that the drawer can be expediently slid horizontally into and out of the vacuum cabinet.

A manually actuated pressure release valve 46 is mounted in closure panel 40. The release valve includes an elastic mounting socket 47 which is frictionally and adhesively placed in an opening 48 formed in the closure panel 40, and includes an annular flange 49 positioned in contact with the exterior surface of the closure panel. Valve spool 50 has a valve stem 51 and an enlarged valve head 52 formed at one end of the valve stem 51. The stem 51 of the valve spool 50 is inserted through the opening 54 of the elastic mounting socket 47, and the enlarged valve head engages against the enlarged, soft annular flange 49. A double ended T-shaped passage 56 is formed along the valve stem 51 and laterally through both the enlarged valve head 52 and through the side of the valve stem 51 at its internal end.

When a vacuum has been drawn within the vacuum compartment 42 and it is desired to manually vent the compartment to the atmosphere, a person can press a finger 60 against the enlarged valve head 52 which compresses the soft annular flange 49 of the elastic mounting socket and which moves the lateral opening 57 of the T-shaped passage 56 beyond the internal end of the pressure release opening 48 of the elastic mounting socket 47. This allows air to flow from the atmosphere through the T-shaped passage 56 as shown by arrows 61 into the vacuum compartment 42. The resiliency of the elastic annular flange 49 permits the movement of the lateral opening 57 beyond the internal end of the elastic mounting socket 47, and when the force from the thumb 60 is released, the lateral opening 57 of the T-shaped passage 56 will withdraw back into the elastic mounting socket 47 due to the resilience of the annular flange 49, blocking the passage. This withdrawal movement of the valve spool 50 is caused by the bias of the elastic material that forms the annular flange 49 of the elastic mounting socket 47.

As illustrated in FIG. 1, vacuum pump 65 communicates through a check valve 66 and conduit 67 through the rear wall 28 of the vacuum cabinet 20. The air control valve 70 communicates through conduit 71 with the vacuum pump 65 and the air control valve has the three positions as illustrated in FIGS. 1, 2 and 3.

As illustrated in FIG. 1, air control valve 70 communicates through recirculation conduit 72 with the vacuum compartment 42, with the recirculation conduit extending through the back wall of the refrigerator and the back wall 28 of the vacuum cabinet. When the air control valve 70 is in the position illustrated in FIG. 1, the vacuum compartment 42 is vented to the atmosphere through recirculation conduit 72 and vent passage 74 of the rotary spool 75 of the control valve.

Figure 2:
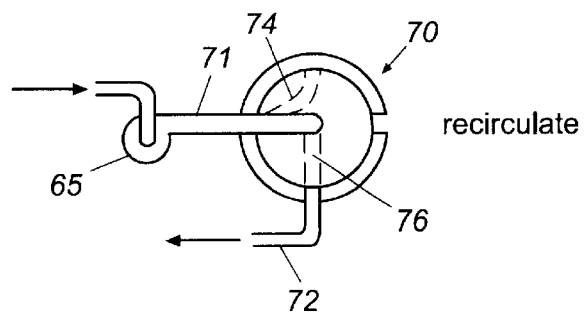
FIG. 2 is a schematic illustration of the vacuum control system of FIG. 1, showing the vacuum control valve in its recirculation position.

As shown in FIG. 2, the rotary spool 75 can be rotated to a position where the vent passage 74 is isolated and air delivery passage 76 communicates from air conduit 71 and vacuum pump 65, so as to recirculate air from the vacuum compartment 42 through the check valve 66, vacuum pump 65, air control valve 70, and recirculation conduit 72 back to the vacuum compartment 42.

Figure 3:
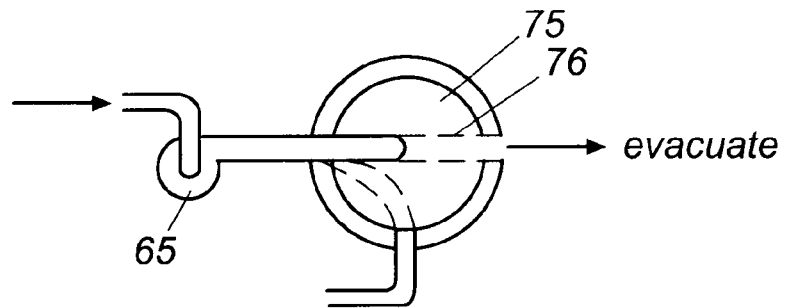
FIG. 3 is a schematic, similar to FIG. 2, but showing the vacuum control valve in its evacuate position.

As illustrated in FIG. 3, rotary spool 75 can be rotated so as to communicate air delivery passage 76 with the atmosphere, so that when the vacuum pump 65 is operated, air is drawn from the vacuum compartment 42, through check valve 66, vacuum pump 65, rotary spool 75, to the atmosphere, thereby drawing air from the vacuum compartment and reducing the air pressure of the vacuum compartment.

Figure 4:
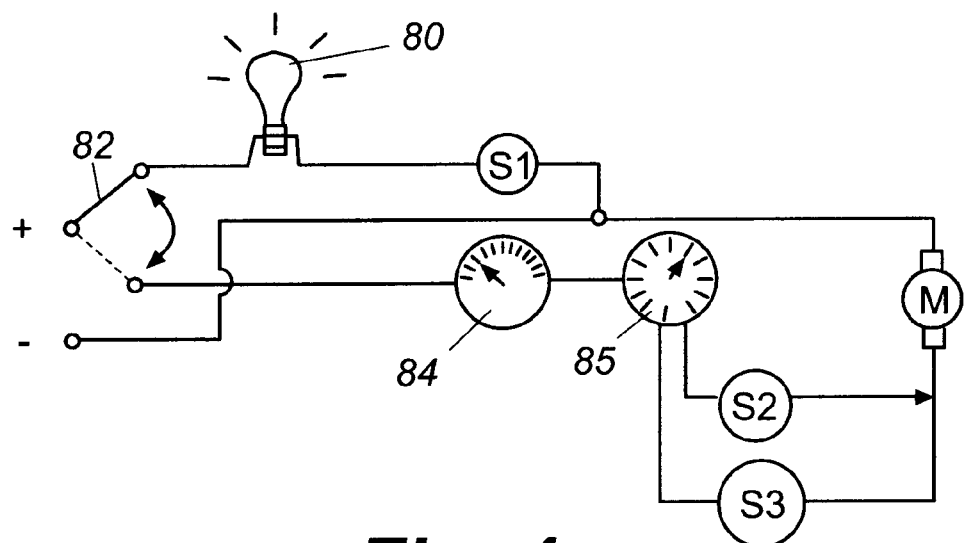
FIG. 4 is an electrical diagram of the vacuum control system.

As illustrated in FIG. 4, circuits are made to the solenoids of valve rotary spool 75, to shift the rotary spool to its positions described above.

When the door of the refrigerator is opened, the refrigerator door switch illuminates the lamp 80 and energizes solenoid S1. Solenoid S1 rotates rotary spool 75 to the position indicated in FIG. 1, whereupon the vacuum compartment 42 is vented through recirculation conduit 72 and vent passage 74 of the rotary spool to the atmosphere. This allows air to move as indicated by arrow 81 into the vacuum compartment 42, equalizing the pressure within the vacuum compartment with the atmospheric pressure. This allows the open top drawer and its closure door 40 to be opened without having to oppose the reduced air pressure normally present in the vacuum compartment 42.

When the refrigerator door 16 is closed, the door switch 82 is moved to its dash line position, which cuts off light 80 and deactivates solenoid S1. When in the dash line position, switch 82 makes a circuit first through a pressure sensor 84 which detects the pressure in vacuum compartment 42 and then through a timer 85 that starts to time out upon movement of the switch 82 to its dash line position.

When the door is first closed, the pressure sensor 84 passes the signal to the timer 85, and the timer actuates solenoid S2 which rotates rotary spool 75 of the air control valve 70 to the position illustrated in FIG. 2, which is the recirculation position. Also, motor M (FIG. 4) of the vacuum pump 65 is actuated, so that the vacuum pump recirculates air from the vacuum compartment 42 through check valve 66, vacuum pump 65, air delivery passage 76 of rotary spool 75, back through recirculation conduit 72 to the vacuum compartment. The recirculating air moves at atmospheric pressure in the vacuum compartment 42, so that it tends to contact the surfaces of the vacuum cabinet 20 and the open top drawer 34, thereby tending to chill the air and the air, in turn, tends to chill the warm food products that have been placed in the vacuum cabinet 20. This provides for rapid cooling of the warm food products substantially at atmospheric pressure.

After the timer 85 reaches its first time out condition, solenoid S2 is deactivated while solenoid S3 is activated, and vacuum pump motor M continues to be activated. Solenoid S3 shifts the rotary spool 75 from the recirculation position of FIG. 2 to the evacuation position of FIG. 3. This causes air to be withdrawn by the vacuum pump 65 through the conduit 67, check valve 66, conduit 71 through air delivery passage 76 to the atmosphere. This tends to reduce the air pressure within the vacuum compartment 42.

The withdrawal of air from the vacuum compartment 42 continues until the air pressure sensor 84 detects that the air pressure within the vacuum compartment 42 has been reduced to a predetermined level, whereupon the circuit made through the air pressure sensor is opened. This deactivates all solenoids S1, S2, and S3 and motor M, to terminate further activity of the air pressure control system.

Should there be leakage of air into the vacuum compartment 42, the rising air pressure to a predetermined level will be detected by pressure sensor 84, and in response the circuit will be recreated through pressure sensor 84, timer 85 and solenoid S3 and motor M, to resume the evacuation of air from the vacuum compartment 42 until the desired low air pressure is again achieved.

Figure 6:
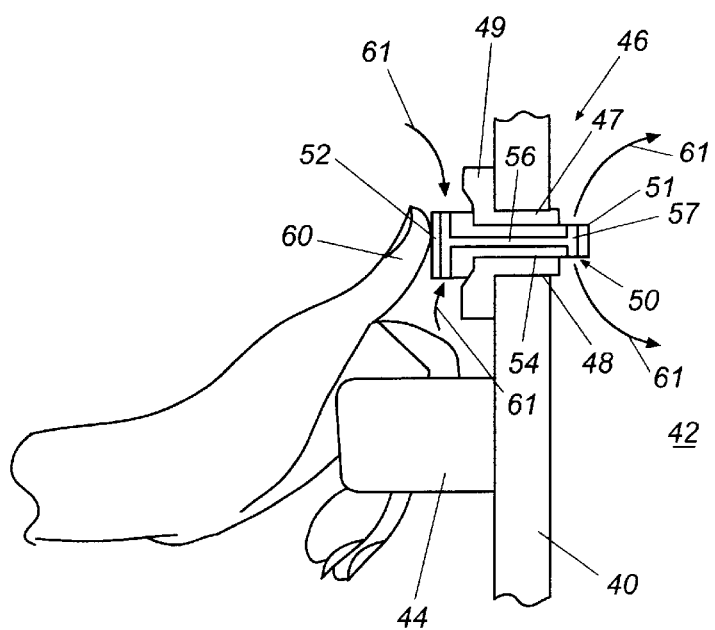
FIG. 6 is a detail illustration, in cross-section, of the manual vacuum release plunger.

As a safety feature, should the motor M of the vacuum pump 65 continue to operate so as to draw an excessively low air pressure in the vacuum compartment 42, the manually actuated pressure release valve 46 will open. The valve spool 51 will be moved further through the closure panel or door 40 (FIGS. 5 and 6) by the difference in pressures outside and inside the vacuum compartment until the lateral opening 57 of the T-shaped passage 56 is exposed to the vacuum compartment 42, whereupon atmospheric air will flow as indicated by arrows 61 through the pressure release valve 46 into the vacuum compartment, thereby continuously leaking air into the vacuum compartment.

Although a preferred embodiment of the invention has been disclosed in detail herein, it will be obvious to those skilled in the art that variations and modifications of the disclosed embodiment can be made without departing from the spirit and scope of the invention as set forth in the following claims.

What is claimed is:

1. In a refrigerator for preserving fresh food items including a refrigerator housing defining a storage space for storing food items, an access opening, a refrigerator door for selectively opening and closing said access opening, a refrigeration system for cooling said storage space, and a door switch responsive to the opening and closing of said refrigerator door to detect when said refrigerator door is open, the improvement therein comprising:

a vacuum cabinet positioned in said storage space defining therein a vacuum compartment and a vacuum compartment opening, and a vacuum compartment door in said storage space for opening and closing said vacuum compartment opening;

a seal strip supported between said vacuum compartment door and said vacuum compartment for sealing said vacuum compartment from the air outside said vacuum compartment;

a vacuum pump having an inlet and an outlet;

a conduit in communication with said vacuum compartment and said inlet of said vacuum pump and arranged to direct air between said vacuum compartment and said vacuum pump to draw air from said vacuum compartment when said vacuum compartment door is closed;

an electrical circuit for activating said vacuum pump in response to said door switch when said door switch detects that said refrigerator door is closed to draw air from said vacuum compartment; and a timer in said circuit for delaying the activation of said vacuum pump after the refrigerator door has been closed for a period sufficient to avoid activation of said vacuum pump during frequent opening and closing of said refrigerator door while retrieving and depositing food items in said refrigerator.

2. The refrigerator of claim 1, wherein said timer is arranged to delay the activation of said vacuum pump for at least one minute after said refrigerator door has been closed.

3. The refrigerator of claim 1, wherein said vacuum pump is positioned outside said refrigerator housing.

4. The refrigerator of claim 1, wherein said switch illuminates a light in said refrigerator storage space.

5. The refrigerator of claim 1, wherein said vacuum compartment door comprises a drawer having an open top container slidable into and out of said vacuum compartment and a closure panel mounted to said open top container for engaging said seal strip when said drawer is positioned in said vacuum compartment.

6. The refrigerator of claim 1, wherein said electrical circuit includes valve means in said conduit for venting said vacuum compartment to the atmosphere.

7. The refrigerator of claim 1, wherein said electrical circuit includes valve means in said conduit for recirculating air between said vacuum compartment and said vacuum pump.

8. The refrigerator of claim 1, wherein said electrical circuit includes valve means in said conduit having a first position for drawing air from said vacuum compartment to the atmosphere, a second position for recirculating air between said vacuum compartment and said vacuum pump, and a third position for venting said vacuum compartment to the atmosphere.

9. The refrigerator of claim 1, wherein electrical circuit includes a pressure detector in communication with said vacuum compartment for deactivating said vacuum pump in response to the air in said vacuum compartment being out of a predetermined pressure range.

10. The refrigerator of claim 9, wherein said pressure detector activates said vacuum pump in response to the air in said vacuum compartment being in a predetermined pressure range.

11. A method of preserving fresh food items in a refrigerator comprising:

placing the food items in a vacuum compartment of a refrigerator having a refrigerator door;

closing the vacuum compartment;

closing the refrigerator door and forming a circuit with a timer in an electrical circuit in response to closing the refrigerator door;

refrigerating the vacuum compartment;

after the timer detects a time lapse after the refrigerator door was closed, drawing air from the vacuum compartment;

as the air is drawn from the vacuum compartment detecting the air pressure in the vacuum compartment; and in response to detecting that the air pressure has decreased to a predetermined pressure below atmospheric pressure, terminating drawing the air from the vacuum compartment.

12. The method of claim 11, further including the steps of:

after the air pressure in the vacuum compartment has decreased to a predetermined pressure below atmospheric pressure and drawing air from the vacuum compartment has been terminated, continuing to detect the pressure of the air in the vacuum compartment and when the pressure of the air in the vacuum compartment increases above a predetermined pressure, resuming the step of withdrawing air from the vacuum compartment.

13. The method of claim 11, further including the step of recirculating the air through the vacuum compartment and a vacuum pump.

14. The method of claim 11, further including:

the step of opening the refrigerator door, and:

in response to opening the refrigerator door, venting the vacuum compartment to the atmosphere.

15. The method of claim 14, further including:

in response to opening the refrigerator door, terminating the step of drawing air from the vacuum compartment.

16. The method of claim 11, wherein the step of closing the vacuum compartment comprises sealing the vacuum compartment against the entry of air into the vacuum compartment.

* * * * *